US009387701B2

(12) United States Patent
Klein Koerkamp

(10) Patent No.: US 9,387,701 B2
(45) Date of Patent: Jul. 12, 2016

(54) METHOD FOR GENERATING RELIEF PRINTS

(71) Applicant: OCE-TECHNOLOGIES B.V., Venlo (NL)

(72) Inventor: Koen Joan Klein Koerkamp, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/965,987

(22) Filed: Dec. 11, 2015

(65) Prior Publication Data

US 2016/0096378 A1 Apr. 7, 2016

Related U.S. Application Data

(63) Continuation of application No. PCT/EP2014/063149, filed on Jun. 23, 2014.

(30) Foreign Application Priority Data

Jun. 26, 2013 (EP) .................................... 13173799

(51) Int. Cl.

| | |
|---|---|
| ***B41J 29/393*** | (2006.01) |
| ***B41J 11/00*** | (2006.01) |
| ***B29C 67/00*** | (2006.01) |

(Continued)

(52) U.S. Cl.

CPC ........... *B41J 11/002* (2013.01); *B29C 67/0059* (2013.01); *B41J 3/407* (2013.01); *B41M 7/0081* (2013.01)

(58) Field of Classification Search

CPC ..... B41J 11/002; B41J 3/407; B29C 67/0059; B41M 7/0081

See application file for complete search history.

(56) References Cited

U.S. PATENT DOCUMENTS

| | | | |
|---|---|---|---|
| 6,846,073 | B2 | 1/2005 | Yamamoto et al. |
| 2009/0091591 | A1 | 4/2009 | Sivan et al. |

(Continued)

FOREIGN PATENT DOCUMENTS

| | | | |
|---|---|---|---|
| DE | 10 2007 022 919 | A1 | 11/2008 |
| DE | 10 2010 019 838 | A1 | 11/2011 |

(Continued)

*Primary Examiner* — Julian Huffman

(74) *Attorney, Agent, or Firm* — Birch, Stewart, Kolasch & Birch, LLP

(57) ABSTRACT

The invention relates to a method for generating a print of a digital image comprising image pixels by a printer comprising a print head and radiation means for curing recording material by irradiation, the recording material to be ejected by the print head on a substrate, wherein the print may have palpable differences between a height of various pixels of the print, the method comprising the steps of providing the digital image comprising an elevation channel for indicating an elevation of each image pixel of the digital image, deriving from the elevation channel of the digital image pixels in the digital image which may be expected to receive such a low amount of radiation that recording material is insufficiently cured, for each derived image pixel adapting at least one elevation channel value of the derived image pixel or image pixels adjacent to the derived image pixel by such an amount that the recording material is expected to be sufficiently cured, and printing the digital image with the adapted elevation channel values. The invention also relates to a computer product and a printer system for applying the method.

7 Claims, 6 Drawing Sheets

(51) Int. Cl.
*B41M 7/00* (2006.01)
*B41J 3/407* (2006.01)

(56) References Cited

U.S. PATENT DOCUMENTS

2010/0221504 A1 9/2010 Bauer
2015/0093544 A1* 4/2015 Van De Vrie ....... B29C 67/0059
428/156

FOREIGN PATENT DOCUMENTS

EP 2 340 937 A1 7/2011
JP 4420685 B2 * 2/2010 .............. B29C 67/00

* cited by examiner

METHOD FOR GENERATING RELIEF PRINTS

CROSS REFERENCE TO RELATED APPLICATIONS

This application is a Bypass Continuation of PCT/EP2014/063149 filed on Jun. 23, 2014, which claims the benefit under 35 U.S.C. §119(a) to patent application Ser. No. 13/173,799.1, filed in Europe on Jun. 26, 2013, all of which are hereby expressly incorporated by reference into the present application.

FIELD OF THE INVENTION

The invention relates to a method for generating a print of an image using a printer, the image comprising image pixels, the printer comprising a print head for ejecting recording material and radiation means for curing the ejected recording material by irradiation, the image having an elevation channel for defining an elevation channel value of each image pixel, which elevation channel value indicates the amount of elevation of a location in the print, which location corresponds to the image pixel, the method comprising the step of providing the image to the printer.

The digital image has a width value, a height value and an elevation value for each image pixel letting the digital image forming a three dimensional object when printed.

The invention further relates to a computer program product, including computer readable code embodied on a computer readable medium, said computer readable code comprising instructions for generating a print in accordance with the method of the invention.

The invention further relates to a print system for generating a print of a digital image, the digital image comprising image pixels and having an elevation channel for defining an elevation channel value of each image pixel, the elevation channel value indicating the amount of elevation of the corresponding image pixel, the print system comprising a print head for ejecting recording material, radiation means for curing the ejected recording material and a print control unit, the print control unit comprising providing means for providing the digital image to the print control unit.

BACKGROUND OF THE INVENTION

Print systems usually apply recording material, like colorants, on a substrate or medium in the form of recording material like toner or ink according to a digitally defined, two-dimensional pattern of pixels with values that indicate a composition of these colorants. This pattern is generated out of a digital image, that may comprise objects in either vectorized or rasterized format, using conventional techniques like interpretation, rendering, and screening by a raster image processor. Depending on the intended print quality and the characteristics of the print process, the image pixels of the pattern may be printed in more than one pass, wherein a position on the substrate has an opportunity to receive recording material in one or more of the passes across the substrate. For every pass a pass image of image pixels to be printed may be derived.

As an extension of the applications of these systems, a print may be made by stacking recording material on top of each other. The effect of this stacking depends on the properties of the recording material. For example, a UV curable recording material or hot melt recording material will develop an elevation depending on the elevation value respectively a number of times an image pixel is printed. Elevation differences between various image pixels may create palpable differences between various parts of the print, giving the print a depth. Such prints are therefore termed 3D prints. An image pixel in a digital image that may lead to a 3D print, is not only characterized by a colour channel value, but additionally by the elevation channel value. The substrate may be a roll of print medium or a cut piece of print medium. The colour channel value is for example a CMYK channel, an RGB channel or a Black-and-White channel.

A category of printers that are used in 3D printing, is based on inkjet printing technology and uses recording material which is to be cured by radiation means, for example UV lamps. In these systems the objects are made by printing multiple amounts of recording material on top of each other in different passes. The different passes are derived from a design of the object resulting in a number of pass images. An object can for example consist of several thousands of passes. During printing of the passes the recording material is cured by means of the radiation means to solidify it. During printing the distance between the print head and the substrate has to be increased after each pass to create space for the growing object. Material is deposited on a substantially fixed distance from the print head to be able to deposit the drops of material accurately on the right place. Therefore all passes are substantially flat. This way of working results in a good exposure of the material to the radiation of the radiation means.

Due to many reasons, such as misdirecting nozzles in a print head, alignment errors and satellites from drops of material, it is possible that not all recording material is deposited on the right place. When recording material ends up in a place on the print that is insufficiently exposed to the radiations means, this material is expected to be insufficiently cured and solidified. Places at the print which are insufficiently exposed to the radiation means are for example holes or trenches in the print. Uncured recording material directed to pixels near a hole or trench may end up in the hole or the trench. In such a hole or trench the uncured recording material is prevented from sufficient exposure to the radiation means, for example when the distance between the bottom of the hole or the bottom of the trench and the print head and the radiation means increases due to the ongoing stacking of layers of recording material on the edges of the hole or trench. Uncured material may have a bad smell, may be unhealthy or toxic, may be soft, may be not hardened or may have a colour deviating from specifications for the print. These factors may lead to a lower value of the print or may result in a safety risk for anyone who comes into contact with the print.

It is an object of the invention to make prints which do not comprise uncured recording material in holes or trenches.

SUMMARY OF THE INVENTION

According to the present invention this object is achieved by a method according to the preamble, the method comprising the further steps of deriving from the elevation channel of the digital image, image pixels in the digital image which are expected to receive such a low amount of radiation at the location in the print corresponding to the image pixel that recording material ejected at said location may be insufficiently cured, for each derived image pixel adapting at least one elevation channel value of the digital image by such an amount that the recording material ejected at said location in the print is expected to be sufficiently cured, wherein the adapting of the at least one elevation channel value of the digital image is at least one out of a group of increasing the elevation channel value of the derived image pixel and decreasing the elevation channel value of at least one image pixel neighbouring the derived image pixel and printing the digital image with the at least one adapted elevation channel value.

Due to the adapted digital image a pixel in the printed image which was going to be insufficiently exposed to the radiation means the hole or trench is reduced in its depth or the edges of the hole or trench are lowered to such an elevation level that the radiation of the corresponding pixels becomes sufficient. Recording material ending up at the same place of the pixel gets the chance to cure. No uncured recording material will end up at a place in the print corresponding to a derived image pixel according to the method, since the place is reachable by the radiation means for sufficient curing of the recording material. According to an embodiment the print is a relief print on a substrate which is substantially flat. A relief print is a three dimensional print of a three dimensional digital image with dimensions width, height and elevation, wherein the range of values of elevation are small with respect to the range of values for width of the digital image and/or for the height of the digital image.

According to an embodiment the deriving step comprises the sub-steps of for each image pixel determining an expected amount of radiation and comparing the expected amount of radiation with a predetermined minimum amount of radiation. The expected amount of radiation may be determined by analysing the digital image at the environment of the image pixel, in particular by analysing the values of the elevation channel for the image pixels in the environment of the image pixel, by analysing the characteristics of the ejection process, for example the drop velocity, the velocity of the print head when printing, the distance of the print head to the location corresponding to the image pixel, by analysing the distribution of the radiation from the print head towards the location corresponding to the image pixel etc.

Experiments carried out reveal a minimum amount of radiation which is needed to sufficiently cure the locations corresponding to the image pixels. The minimum amount is a condition for sufficient curing in order to avoid toxic effects, unsolidified soft recording material, colour deviations etc. Such a predetermined minimum amount of radiation is compared to the expected amount of radiation per image pixel. An image pixel having an expected amount of radiation which is lower than the predetermined minimum amount, is a candidate for applying the adapting step of the method according to the present invention to the image pixel and/or its neighbouring pixels.

According to an embodiment the elevation channel value of a derived image pixel after the adapting step is lower than elevation channel values of pixels adjacent to the derived image pixel after the adapting step. By doing so, the visual appearance of the location on the print corresponding to the derived image pixel is still the appearance of a hole or trench as defined by the original elevation channel value of the derived pixels. It is noted that colour channels of the derived image pixel and its adjacent image pixels may be changed in order to get an appearance of the location after the adapting step which appearance resembles the appearance of the location when the adaptation step would not have been applied.

It is understood that the various measures may be combined. The invention also relates to a recording medium comprising computer executable program code configured to instruct a computer to perform any of the embodiments of the method according to the invention.

The invention also relates to a print system for generating a print of a digital image, the digital image comprising image pixels and having an elevation channel for defining an elevation channel value of each image pixel, the elevation channel value indicating the amount of elevation of the corresponding image pixel, the print system comprising a print head for ejecting recording material, radiation means for curing the ejected recording material and a print control unit, the print control unit comprising providing means for providing the digital image to the print control unit, deriving means for deriving from the elevation channel of the digital image, image pixels in the digital image which are expected to receive such a low amount of radiation at the location in the print corresponding to the image pixel that recording material ejected at said location in the print may be insufficiently cured, adapting means for adapting for each derived image pixel at least one elevation channel value of the digital image by such an amount that the recording material ejected at said location in the print is expected to be sufficiently cured, wherein the adapting of the at least one elevation channel value of the digital image is at least one out of a group of increasing the elevation channel value of the derived image pixel and decreasing the elevation channel value of at least one image pixel neighbouring the derived image pixel and, wherein the printer is able to generate a print of the digital image with the at least one adapted elevation channel value by ejecting recording material.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
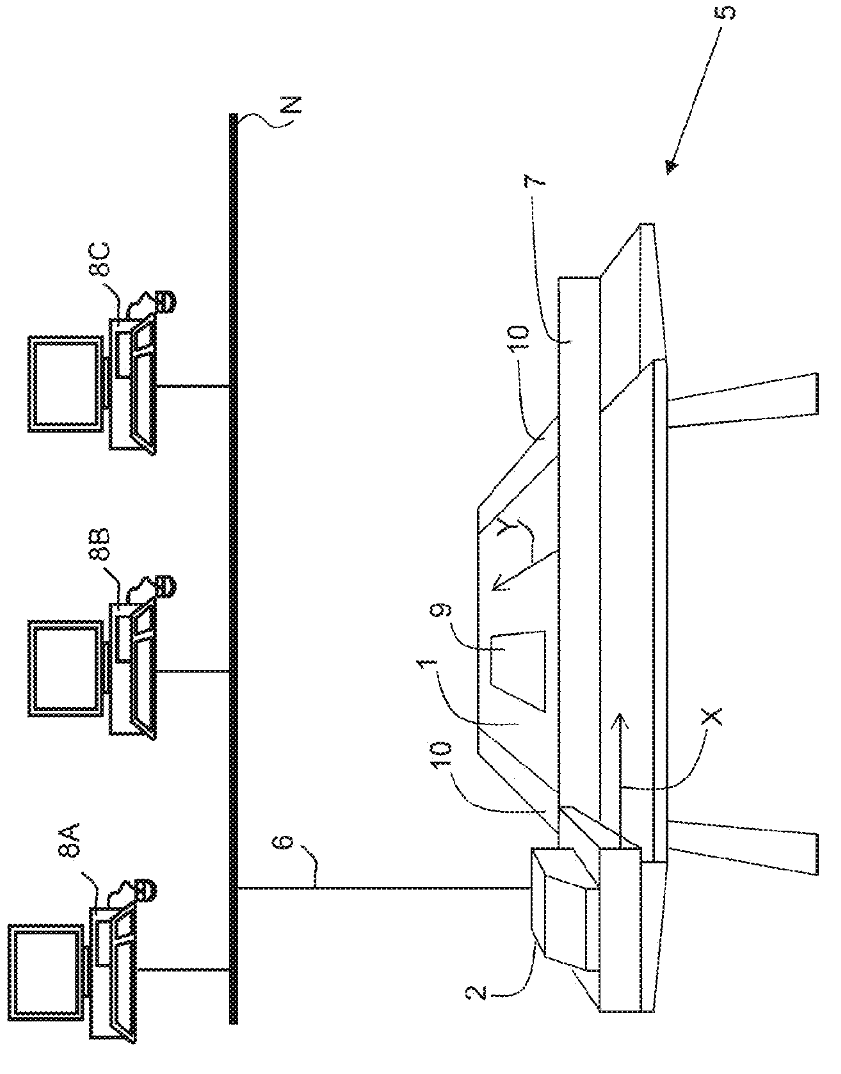
FIG. 1 is a print system in which the invented method is applicable.

FIG. 1 is a print system 5 comprising a number of workstations 8B, 8C, which may be personal computers or other devices for preparing colour image data and elevation data for prints to be printed. As an example a relief print is mentioned here-below but other kinds of 3D prints may be envisioned. A relief print is a three dimensional print with dimensions width, height and elevation, wherein the range of values of elevation asre small with respect to the range of values for width of the digital image and/or for the height of the digital image.

The workstations 8B, 8C have access to a network N for transferring the colour image data and the elevation data to a print controller 8A that is configured to receive print jobs for prints and derive pass images. The print controller 8A may be part of the print system 5 that further comprises a print engine 2 for applying colorants, for example cyan (C), magenta (M), yellow (Y), black (K) and white (W) colorant, to a flat print medium 9 in order to obtain a printed image. The flat print medium is placed on the flat bed 1. The print engine 2 reciprocally scans the flat bed 1 in a second direction X along a gantry 7 perpendicular to a first direction Y of the gantry 7 over the flat bed 1 along guiding parts 10. This way of working is advantageous for a rigid print medium. A rigid print medium is in many cases suitable for creating the relief print. A UV curable recording material is applied by a print head integrated in the print engine 2. The recording material solidifies upon cooling after printing on the print medium 9. The UV-curable recording material solidifies after exposure to UV-light from UV lamps integrated in the print engine 2 (not shown). Other radiation means for curing recording material other than UV curable recording material may be envisioned. According to another embodiment the print system is a roll-to-roll printer wherein the print medium is stored on a roll hanging under the flat bed 1 and giving out the medium through a slot in the flatbed 1.

Preferentially the distance between the flat bed surface 1 and the print head in the print engine 2 that are used to apply the recording material is variable. This distance may be varied after a number of passes have been printed in order to bring the relief surface within the latitude of the print elements. The latitude of the distance between a substrate and the scanning print head in print engine 2 may be about 0.5 to 50 mm. The thickness of an individual printed pass pixel may be in a range of about 10-100 μm. After each slice printed in at least one pass, the print elements height in the print engine 2 is adapted with the slice thickness.

The printer comprises a user interface which according to this embodiment is integrated in printer controller 8A for selecting a print job and optionally adapt a print job parameter, such as an absolute height parameter for indicating a maximum height of the relief print. In this embodiment a maximum number of passes for one pixel is used as height parameter. In another embodiment a user interface is provided as a network site that is accessible with a browser on a client computer.

After sending a print job comprising image data from a workstation to the printer controller, the print job will be made visible on the user interface. It may be scheduled for further processing after selection from a list of print jobs or, alternatively, if the print job is on top of the list of print jobs. The print job comprises parameter values that determine the way the image data are to be printed, such as the way how the image data are to be converted into print data.

Methods to convert relief image data into pass images are known from the technology field of 3D printing. The colour channels of the relief image may determine the colour of the visible part of each pixel, i.e. the upper part of each elevated pixel. The elevation channel of the relief image determines the elevation of each pixel.

Figure 2A:
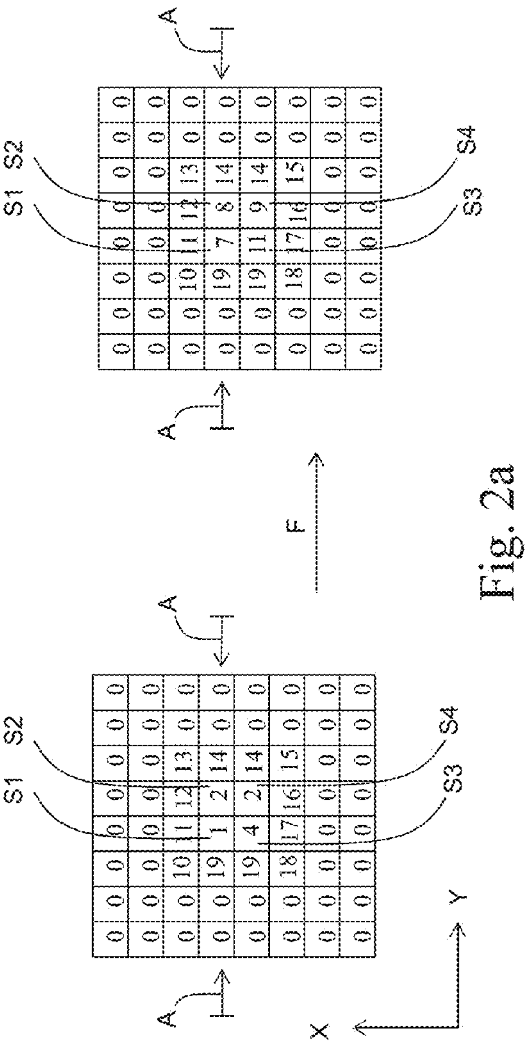
FIGS. 2$a$-2$b$ show a first embodiment of the method according to the invention showing an elevation channel of a digital image and its adaptation by means of increasing elevation values of pixels.
Figure 2B:
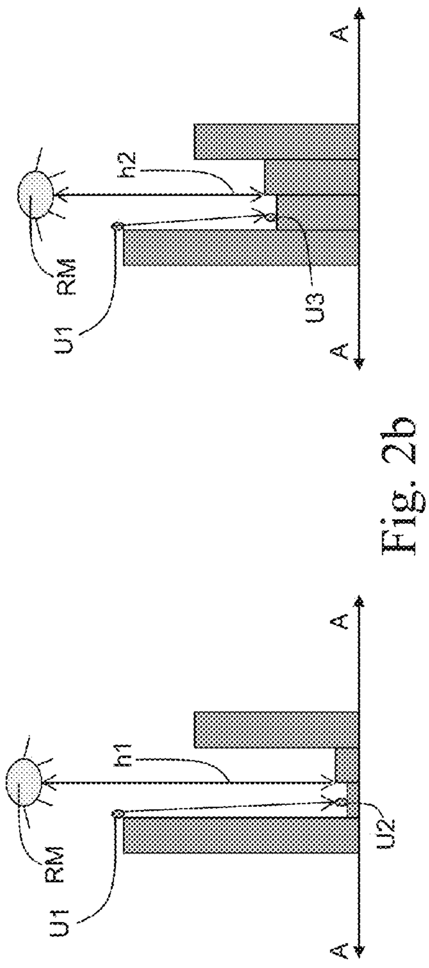

FIGS. 2*a*-2*b* show a first embodiment of the method according to the invention showing an elevation channel of a digital image and its adaptation by means of increasing elevation values of pixels. FIG. 2*a* is an example of a part of the elevation channel of a digital image and its adaptation. 8×8 Pixels are shown as squares. Each square has written an elevation value inside it. The middle squares S1, S2, S3, S4 represent a hole, since the values corresponding to the squares S1, S2, S3, S4, being equal to 1, 2, 4, 2 respectively, are lower than the values of the surrounding pixels, said values being equal to 10, 11, 12, 13, 14, 14, 15, 16, 17, 18, 19, 19 respectively. A width of the hole in a first direction X is 2 pixels, a width of the hole in a second direction Y is 2 pixels, while the elevation differences along the boundaries of the hole vary from 10 to 18. The aspect ratios along the border of the hole are respectively 5, 5, 6, 6, 7, 6.5, 7.5, 9 and thus vary from 5 to 9. The left side of FIG. 2*b* shows a schematic view of a part of the print if it would be printed according to the elevation channel values of the 8×8 pixels without applying the transformation F. The part of the print is corresponding to a row A of the 8×8 pixels in FIG. 2*a*, having elevation channel values 0, 0, 19, 1, 2, 14, 0, 0. When during printing of a layer with a substantial high elevation channel value (19) in this case, a piece of recording material U1 intended to be placed in the layer corresponding to elevation channel level 19 is misdirected and falls into the hole at a position U2 near the layer corresponding to elevation channel level 1. It is noted that the piece of recording material U1 at position U2 is will not be cured sufficiently anymore as will be explained hereinafter.

At a given moment, or even at a given moment for each layer which is going to be put on the substrate radiation means RM is moving over the hole in order to cure the recording material ejected for that layer. The distance of between the radiation means RM and the latest printer layer is tuned for a sufficient curing process. However, the recording material U1 at the position U2 has such a large distance h1 to the radiation means RM that the recording material U1 will be insufficiently cured since the expected amount radiation is too low compared to a predetermined minimum amount of radiation. The predetermined minimum amount of radiation may be stored in and retrievable from the printer controller 8A shown in FIG. 1.

According to this first embodiment the elevation values of the squares S1, S2, S3, S4 are increased by means of the transformation F applied to the values of the elevation channel. After the transformation F the values in the squares S1, S2, S3, S4 are equal to 7, 8, 11, 9 respectively, as shown on the right side of FIG. 3*a*. It is noted that the elevation values of S1, S2, S3, S4 stay below the elevation values of all elevation values of the adjacent pixels. This is advantageous since the visual impression of the hole with a smaller depth still resembles the visual impression of the original hole. As shown on the right side of FIG. 3*b*, in the case that the piece of recording material U1 is misdirected and falls in the hole, the uncured piece U1 will end up at a position U3 which has a smaller distance h2 to the radiation means RM than the distance h1 expected in the print before the transformation F. The increase of the values of the squares S1, S2, S3, S4 is determined such that the distance h2 is small enough to let the radiation means RM sufficiently cure the piece U1 at the position U3.

Figures 3A, 3B:
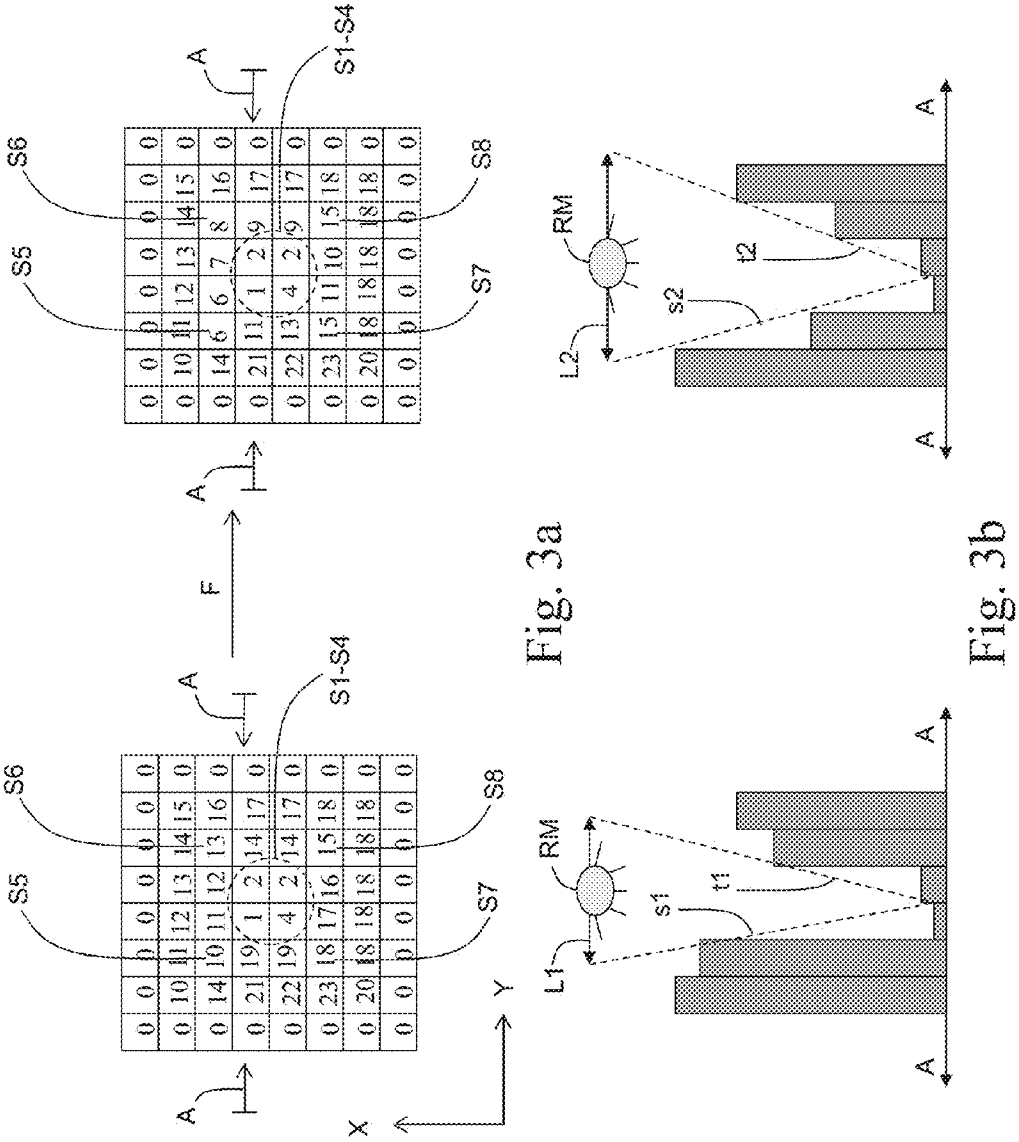
FIG. 3$a$-3$b$ show a second embodiment of the method according to the invention showing an elevation channel of a digital image and its adaptation by means of decreasing elevation values of pixels.

FIGS. 3*a*-3*b* show a second embodiment of the method according to the invention showing an elevation channel of a digital image and its adaptation by means of decreasing elevation values of pixels. FIG. 3*a* is an example of a part of the elevation channel of the digital image and its adaptation. 8×8 Pixels are shown as squares. Each square has written an elevation value inside it. The middle four squares represent a hole, since the values corresponding to the middle four squares, being equal to 1, 2, 4, 2 respectively, are lower than the values of the adjacent pixels—such as S5, S6, S7, S8—, said values being equal to 10 (S5), 11, 12, 13 (S6), 14, 14, 15

(S8), 16, 17, 18 (S7), 19, 19 respectively. A width of the hole in a first direction X is 2 pixels, a width of the hole in a second direction Y is 2 pixels, while the elevation differences along the boundaries of the hole vary from 10 to 18. The aspect ratios along the border of the hole are respectively 5, 5, 6, 6, 7, 6.5, 7.5, 9 and thus vary from 5 to 9. The left side of FIG. 3*b* shows a schematic view of a part of the print if it would be printed according to the elevation channel values of the 8×8 pixels without applying the transformation F. The part of the print is corresponding to a row A of the 8×8 pixels in FIG. 3*a* having elevation channel values 0, 21, 19, 1, 2, 14, 17, 0. Steepnesses of the hole in the direction corresponding to row A are indicated by the dashed lines s1, t1. When the radiation means RM are moving over the hole when depositing a layer corresponding to the 21th elevation channel value, for example in the direction corresponding with row A, the radiation means RM may cure recording material which ends up in the hole during a time corresponding to a distance L1. Besides that the distance between the radiation means RM and the bottom of the hole at elevation channel values 1 and 2 may be too large, the time corresponding to the distance L1 may also be too small for sufficient curing. The expected radiation amount at the bottom of the hole is lower than the predetermined minimum amount.

When during printing of a layer with the high elevation channel value (21) in this case, a piece of recording material intended to be placed in the layer corresponding to elevation channel level 21 is misdirected, the piece of recording material may fall into the hole at a position corresponding to elevation channel level 1 or 2. It is noted that the piece of recording material at such a position will not be sufficiently cured anymore as will be explained here-below.

At a given moment, or even at a given moment for each layer which is going to be put on the substrate radiation means RM is moving over the hole in order to cure the recording material ejected for that layer. The velocity of the radiation means RM and the distance between the radiation means RM and the latest printer layer corresponding to the elevation channel value 21 is tuned for a sufficient curing process. However, the recording material at the position at the bottom of the hole is only radiated when the radiation means is moving on the line L1 during a time period which is so small that the recording material at the bottom of the hole will be insufficiently cured since the expected amount radiation is too low compared to a predetermined minimum amount of radiation. The predetermined minimum amount of radiation may be stored in and retrievable from the printer controller 8A shown in FIG. 1.

According to this second embodiment the elevation values of the squares adjacent to the four middle squares are decreased by means of the transformation F applied to the values of the elevation channel. For example, after the transformation F the values in the squares S5, S6, S7, S8 are equal to 6, 8, 15, 15 respectively. It is noted that the elevation values of the adjacent pixels S5, S6, S7, S8 stay above the elevation values of the image pixels of the four middle squares. Original steepnesses s1, t1 of the hole as shown on the left side of FIG. 3*b* are replaced by steepnesses s2, t2 as shown on the right side of FIG. 3*b*. Therefore the original line piece L1 on which the radiation means RM may move, is extended to a line piece L2 which is larger than the original line piece L1. In the case that the piece of recording material U1 is misdirected and falls in the hole, the uncured piece U1 will end up at a position at the bottom of the hole which is longer radiated during the time that the radiation means RM stays on the line piece L2 than when the radiation means RM would have stayed on the smaller line piece L1 before the transformation F. The decrease of the values of the squares S5, S6, S7, S8, of the squares between the squares S5 and S6, of the squares between the squares S6 and S8, of the squares S8 and S7, and of the squares S7 and S5 is determined such that the distance L2 is large enough to let the radiation means RM sufficiently cure a piece on the bottom of the hole during the time period of moving along the distance L2.

Figure 4A:
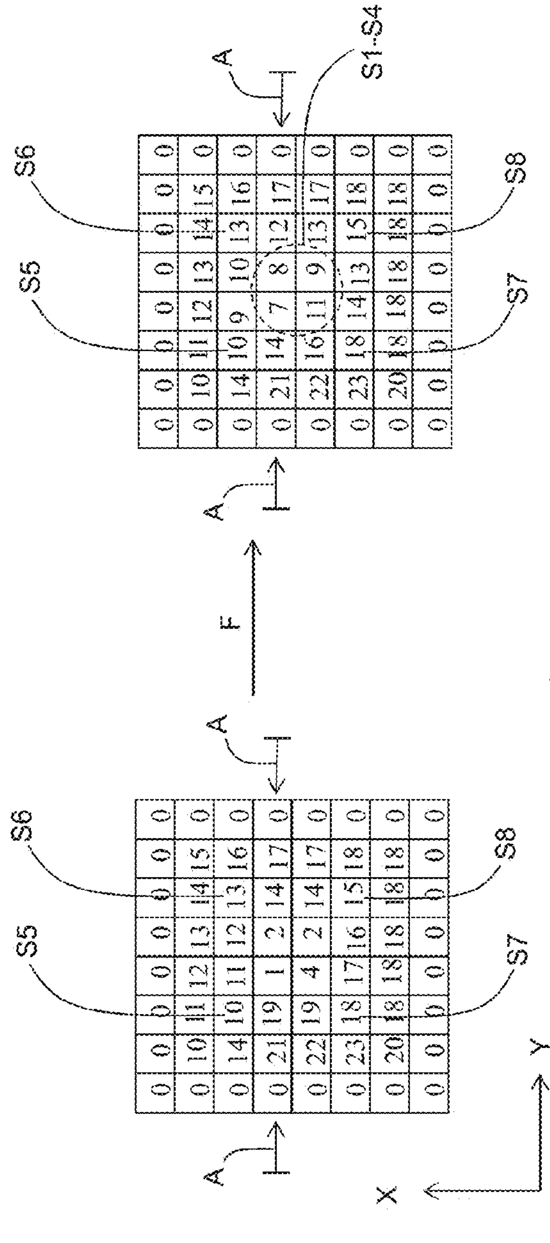
FIG. 4$a$-4$b$ show a third embodiment of the method according to the invention showing a combination of the first embodiment and the second embodiment.
Figure 4B:
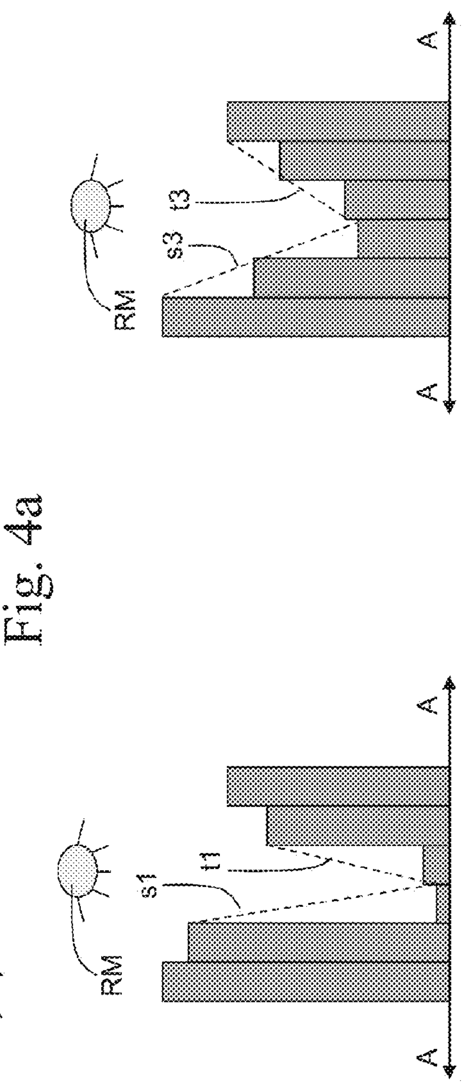

FIG. 4*a*-4*b* show a third embodiment of the method according to the invention showing a combination of the first embodiment and the second embodiment. The elevation channel values of squares S1-S4 are increased. The elevation channel values of squares adjacent to the four middle squares S1-S4, where among the squares S5-S8, are decreased in the same transformation F. The original steepnesses s1, t1 are replaced by new steepnesses s3, t3 which are even smaller than the steepnesses s2, t2 in FIG. 3*b*.

Figure 5:
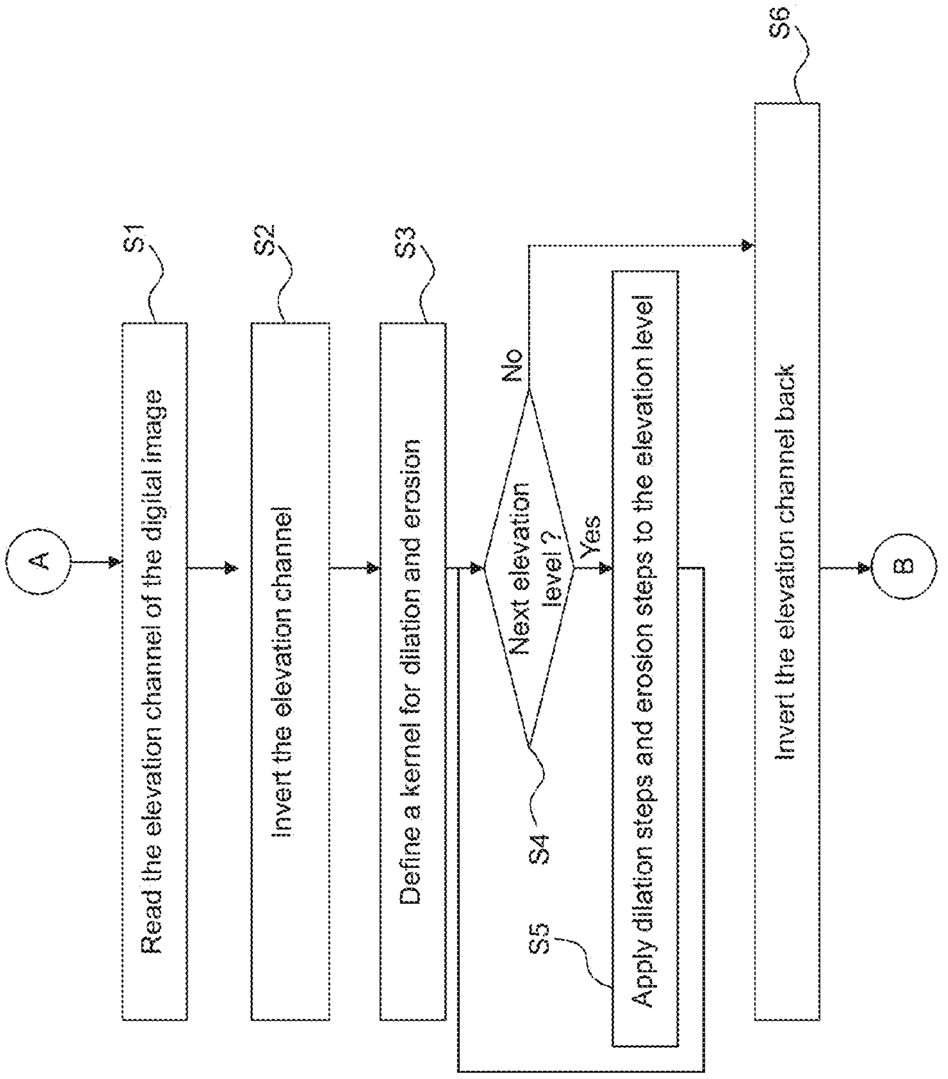
FIG. 5 shows a flow diagram according to the method of the present invention.

FIG. 5 shows a flow diagram according to the method of the present invention. The flow diagram is applied in FIG. 6.

The flow diagram is applied according to an embodiment of the invented method on a digital image having an elevation channel. Starting point A is leading to the first step S1 of reading the elevation channel of the digital image. The following parameters may be set: a maximum width of holes to be filled, an allowed ratio between width and depth of holes, the print resolution, a maximum elevation channel value, a maximum greyscale value, a number of times that an erosion operation and a dilation operation have to be performed. This algorithm is advantageous since holes in the elevation channel with edges which have an angle of inclination are also filled per elevation level according to the constraints of a maximum width of the hole and an allowed aspect ratio of the hole.

In a second step S2 the elevation channel of the digital image is inverted in order to let a grey scale value zero correspond with the lowest elevation channel value.

In a third step S3 a kernel is defined for dilation and erosion. A 3 by 3 kernel may be applied.

In a fourth step S4 it is checked if all elevation channel levels are stepped through. If so, the procedure proceeds to a last step S6. If not so, dilation steps and erosion steps are applied to the selected elevation channel level in a fifth step S5. Holes are detected and the elevation values of the image pixels of the holes are increased by stepping through the elevation channel from bottom to top to evaluate all elevation channel levels. At each elevation channel level a well known dilation operation is applied a number of times upon the image pixels of the elevation level followed by applying a well known erosion operation a same number of times upon the image pixels of the elevation channel level. The dilation and erosion operation are applied by means of the kernel defined in the third step S3. After the application of the erosion steps and dilation steps the procedure return to the fourth step S4.

In the last step S6 the elevation channel of the digital image is inverted back and end point B is reached.

Figure 6:
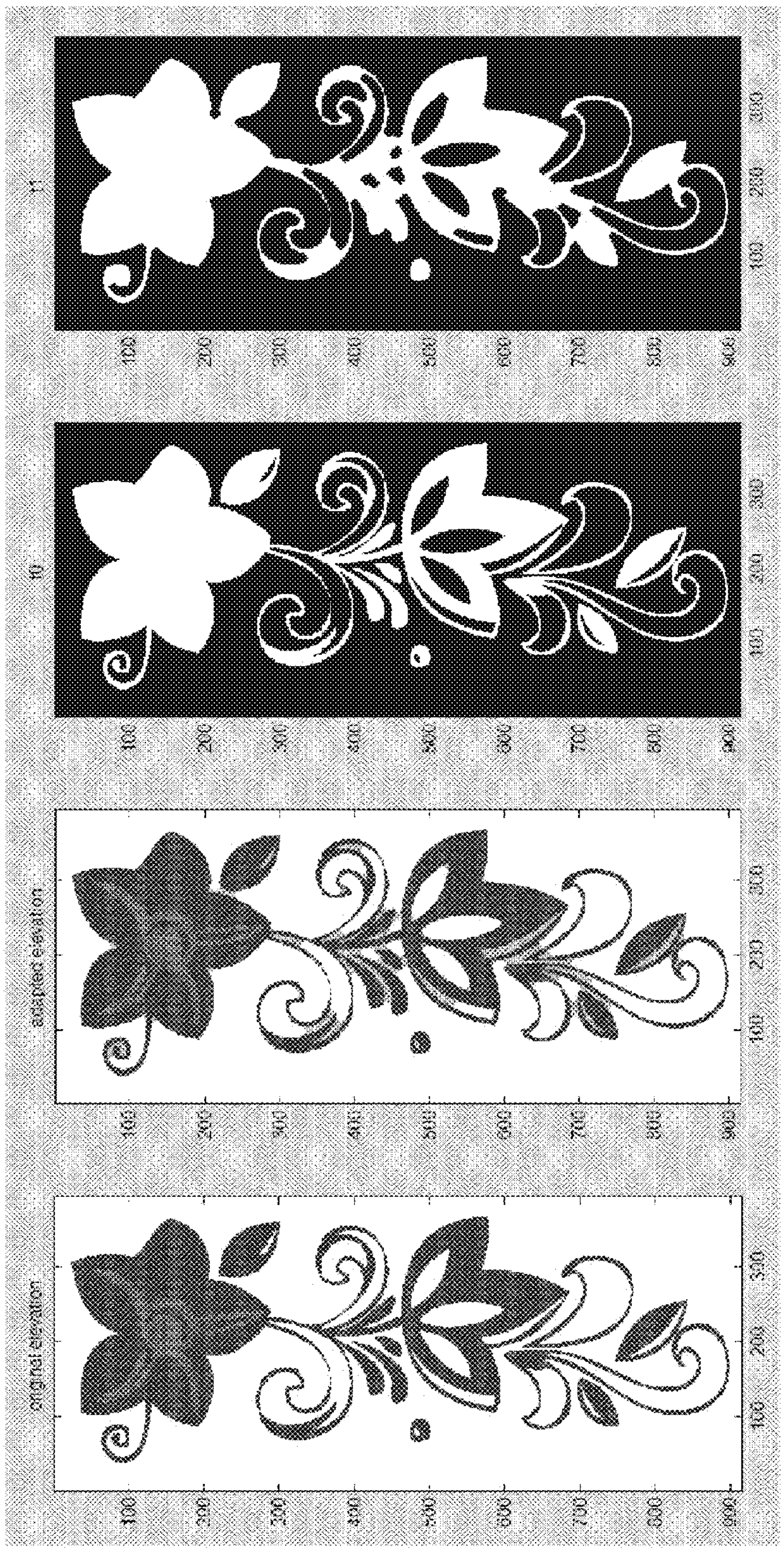
FIG. 6 shows images of the results of the flow diagram of FIG. 5 applied to an elevation channel of a digital image.

FIG. 6 shows images of the results of the flow diagram of FIG. 5 applied to an elevation channel of a digital image having an elevation channel. The elevation channel of the digital image is about 1000 by about 400 image pixels as indicated by the numbers along the axes and has a resolution of 300 dpi. From left to right, a first digital image shows an original elevation channel of the digital image, a second digital image shows an adapted elevation channel of the digital image, a third digital image shows a digital image t0 which is the elevation channel of the digital image which elevation channel has been threshold at a certain gray scale value. A fourth digital image shows a digital image t1 which equals t0, but with all small holes filled up after applying the steps of dilation and erosion.

The above disclosure is intended as merely exemplary, and not to limit the scope of the invention, which is to be determined by reference to the following claims.

The invention claimed is:

1. A method for generating a print of a digital image using a printer, the digital image comprising image pixels, the printer comprising:

a print head for ejecting recording material; and radiation means for curing the ejected recording material by irradiation, the digital image having an elevation channel for defining an elevation channel value of each image pixel, which elevation channel value indicates the amount of elevation of a location in the print, which location corresponds to the image pixel, the method comprising the steps of:

a) providing the digital image to the printer;

b) deriving from the elevation channel of the digital image, image pixels in the digital image which are expected to receive such a low amount of radiation at the location in the print corresponding to the image pixel that recording material ejected at said location may be insufficiently cured;

c) for each derived image pixel, adapting at least one elevation channel value of the digital image by such an amount that the recording material ejected at said location in the print is expected to be sufficiently cured, wherein the adapting of the at least one elevation channel value of the digital image is at least one out of a group of:

increasing the elevation channel value of the derived image pixel; and decreasing the elevation channel value of at least one image pixel neighbouring the derived image pixel; and d) printing the digital image with the at least one adapted elevation channel value.

2. The method according to claim 1, wherein the deriving step comprises the sub-steps of, for each image pixel, determining an expected amount of radiation; and comparing the expected amount of radiation with a predetermined minimum amount of radiation.

3. A non-transitory recording medium comprising computer executable program code configured to instruct a computer to perform the method according to claim 2.

4. The method according to claim 1, wherein the elevation channel value of a derived image pixel after the adapting step is lower than elevation channel values of pixels adjacent to the derived image pixel after the adapting step.

5. A non-transitory recording medium comprising computer executable program code configured to instruct a computer to perform the method according to claim 4.

6. A non-transitory recording medium comprising computer executable program code configured to instruct a computer to perform the method according to claim 1.

7. A print system for generating a print of a digital image, the digital image comprising image pixels and having an elevation channel for defining an elevation channel value of each image pixel, the elevation channel value indicating the amount of elevation of the corresponding image pixel, the print system comprising a print head for ejecting recording material, radiation means for curing the ejected recording material and a print control unit, the print control unit comprising:

a) providing means for providing the digital image to the print control unit;

b) deriving means for deriving from the elevation channel of the digital image, image pixels in the digital image which are expected to receive such a low amount of radiation at the location in the print corresponding to the image pixel that recording material ejected at said location in the print may be insufficiently cured; and c) adapting means for adapting for each derived image pixel at least one elevation channel value of the digital image by such an amount that the recording material ejected at said location in the print is expected to be sufficiently cured, wherein the adapting of the at least one elevation channel value of the digital image is at least one out of a group of:

increasing the elevation channel value of the derived image pixel; and decreasing the elevation channel value of at least one image pixel neighbouring the derived image pixel and, wherein the printer is able to generate a print of the digital image with the at least one adapted elevation channel value by ejecting recording material.

* * * * *